United States Statutory Invention Registration [19]

[11] Reg. Number: H976

Matta et al. [43] Published: Nov. 5, 1991

[54] APPARATUS AND METHOD FOR MEASURING ELONGATIONAL VISCOSITY OF A POLYMERIC SOLUTION

[75] Inventors: Joseph E. Matta; Raymond P. Tytus, both of Bel Air, Md.

[73] Assignee: The United States of America as represented by the Secretary of the Army, Washington, D.C.

[21] Appl. No.: 495,052

[22] Filed: Mar. 16, 1990

[51] Int. Cl.[5] ..... G01N 11/02
[52] U.S. Cl. ..... 73/54; 73/866
[58] Field of Search ..... 73/54, 56, 866, 64.4

[56] References Cited

U.S. PATENT DOCUMENTS 3,463,014 8/1969 Katz et al. ..... 73/866

FOREIGN PATENT DOCUMENTS 259256 8/1988 German Democratic Rep. .... 73/54
693152 10/1979 U.S.S.R. ..... 73/54
1318845 6/1987 U.S.S.R. ..... 73/64.4
1390566 4/1988 U.S.S.R. ..... 73/54

*Primary Examiner*—Linda J. Wallace
*Attorney, Agent, or Firm*—Anthony T. Lane; Edward Goldberg; Edward F. Costigan

[57] ABSTRACT

A novel falling cylinder extensional rheometer is provided for measuring the elongational viscosity of a polymeric solution at stretch rates comparable to those associated with aerodynamic liquid breakup and which is suitable with toxic liquids. The rheometer consists of an upper cylinder and a lower cylinder, both vertically arranged or oriented and having their longitudinal axes coincidental. A small quantity of liquid is inserted between the end of the two cylinders that are vertically spaced one above the other. The upper cylinder is held fixed while the lower cylinder rests initially on top of an air cylinder piston. When the piston is activated, it quickly retracts downwardly allowing the lower cylinder to fall and stretch the liquid sample adhering between the ends of the upper and lower cylinders. A high speed camera is used to photograph the falling lower cylinder and the ligament stretching.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FALL VELOCITY VS. TIME, SILICONE RESULTS

APPARATUS AND METHOD FOR MEASURING ELONGATIONAL VISCOSITY OF A POLYMERIC SOLUTION

BACKGROUND AND SUMMARY OF THE INVENTION

This invention relates to a viscosity measuring apparatus, and more particularly, it pertains to an apparatus and a method for measuring the elongational viscosity of a polymeric solution at stretch rates which are comparable to those associated with aerodynamic liquid breakup and that is suitable for use with toxic liquids.

PRIOR ART

The best known prior art relating to this invention are:

J. E. Matta and R. P. Tytus, "Viscoelastic Breakup in a High Velocity Airstream," J. Appl. Polymer Sci. Vol. 27, pp. 397–405 (1982);

J. E. Matta, R. P. Tytus and J. L. Harris, "Aerodynamic Atomization of Polymeric Solutions," Chem. Eng. Com. Vol. 19, pp. 191–204 (1983);

K. C. Chao, C. A. Child, E. A. Gren, and M. C. Williams, "The Anti-Misting Action of Polymer Additives in Jet Fuels," 53rd Annual Meeting of the Society of Rheology, Ky, Oct. 11–15, (1981);

M. Goldin, J. Yerushalmi, R. Pfeffer, and R. Shinnar, "The Stability of Viscoelastic Capillary Jets," J. Fluid Mech. Vol. 38, p. 689 (1969);

S. L. Goren and M. Gottlieb, "Surface-Tension-Driven Breakup of Viscoelastic Threads," J. Fluid Mech. Vol. 120, pp. 245–266 (1982);

C. J. S. Petrie, *Elongational Flows*, Pitman Publishing Limited, London, England, (1979); and F. T. Trouton, Proc. Roy. Soc. vol. A77, p. 426 (1906).

RECENT TECHNICAL PUBLICATION

A recent technical publication now available is:

Independent Research Program Annual Report CRDEC-SP-005, Author: Joseph E. Matta, dated April 1989, Chemical Research, Development and Engineering Center, Aberdeen Proving Ground, Maryland 21010-5423, U.S. Army Armament, Munitions and Chemical Command

GENERAL PURPOSE OF INVENTION AND PRIOR METHODS

The general purpose of this invention was to develop an apparatus and method of measuring the elongational viscosity of a polymeric solution at stretch rates comparable to those associated with aerodynamic liquid breakup and that is suitable for use with toxic liquids.

Although elongational viscosity measurements of viscous polymer melts are possible using commercially available tensile testing machines, they are inappropriate for use with polymer solutions. For example, a tensile testing machine measures the force necessary to stretch a rodlike sample at a constant strain rate in order to determine the elongational viscosity.

Polymer solutions, however, whose elongational rheology play a significant role in many processes such as atomization, have viscosities far too low to form a stable rodlike sample and, therefore, cannot be tested using commercially available tensile testing machines.

Other methods of characterizing the extensional flow behavior of a solution exist (e.g. tubless syphon, impinging jets, and spin rheometer). However, these methods are not very suitable for use with toxic liquids since large fluid quantities are required. Since these methods all involve pre-shearing of the liquid which is known to significantly affect the fluid rheology, the measurements are questionable.

Extensional measurements of polymeric solutions are also possible using a falling drop experiment. Here a liquid sample is extruded vertically and downwardly from a capillary until the drop forming at the capillary tip is no longer supported by surface tension. The falling drop stretches the connecting ligament. This method is limited since it is not possible to vary the extension rate nor insure that liquid does not flow into the drop during the stretching process.

In addition, it is not possible to precisely initiate the moment of stretching since this is controlled largely by the surface tension of the liquid. Thus, in order to investigate the stretching flow of polymer solutions at high stretch rates and suitable for use with toxic liquids a novel free fall apparatus was developed.

OBJECTS OF THE INVENTION

It is an object of this invention to provide a falling cylinder extensional rheometer that can be used with much lower viscosity solutions than possible with commercially available instrumentation.

Another object of this invention is to provide a novel rheometer of the falling cylinder type that requires only small liquid quantities to obtain an extensional measurement.

To provide a falling cylinder extensional type rheometer in which the surface effects are minimal, is yet another object of this invention.

An to provide a falling cylinder extensional type rheometer in which the sample being tested undergoes no pre-shearing, is still another object of this invention.

Other objects of this invention are the fabrication and use of a falling cylinder apparatus for stretching a fluid ligament in order to measure its elongational viscosity, and additionally by the use of cylinders of various weights, to vary the extension rates.

To provide a falling cylinder apparatus for measuring the elongational viscosity of a fluid, is yet another object of this invention.

And to provide a falling cylinder apparatus for measuring the elongational viscosity of a fluid, one which requires no calibration, wherein the initiation of the stretching process is precisely controlled, and further wherein the extension rate is varied by varying the cylinder mass or by applying a known external force to the cylinder, are other important objects of the invention.

Another object of this invention is to provide a falling cylinder extensional rheometer setup which is economical, and one in which the setup is a fraction of the cost of a commercially available testing machine.

Finally to provide a falling cylinder extensional rheometer system which is safe and can be used with toxic fluids since it can easily fit into a standard glove box and since the sample size is very small, an additional safety factor, is inherent within the falling cylinder apparatus.

It is an object of this invention to provide a falling cylinder extensional rheometer that can be used with much lower viscosity solutions than possible with commercially available instrumentation.

And another object of this invention is to provide a novel rheometer of the falling cylinder type that requires only small liquid quantities to obtain an extensional measurement.

BRIEF DESCRIPTION OF THE DRAWINGS

These and other objects and attendant advantages of this invention will become more obvious and apparent from the following detailed description and accompanying drawings in which.

DESCRIPTION OF THE PREFERRED EMBODIMENTS

Figure 1:
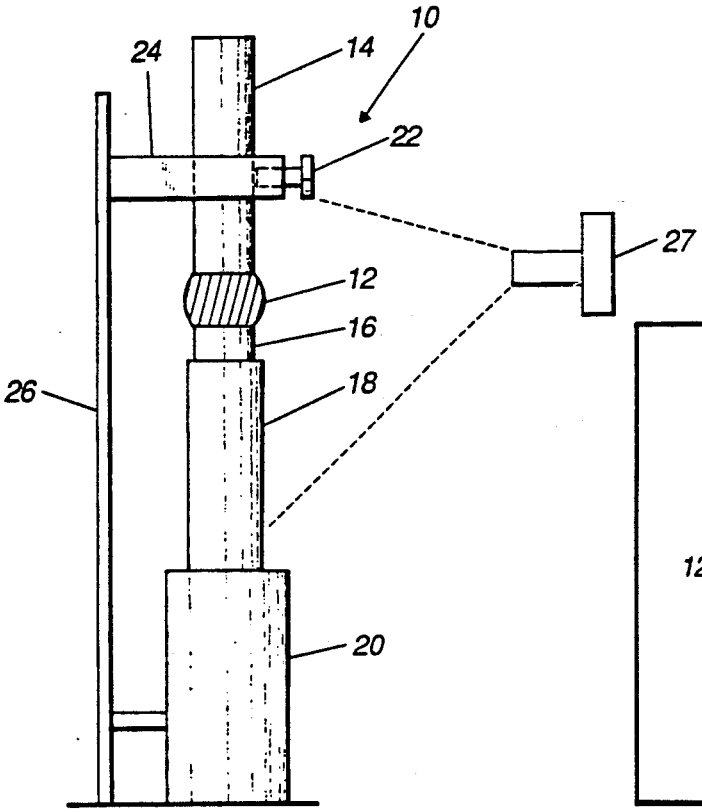
FIG. 1 is a side view of a falling cylinder apparatus incorporating features of this invention.

Referring now to FIG. 1 of the drawings, there is shown a novel falling cylinder extensional rheometer 10 which is used to elongate fluid. This rheometer 10 was developed to generate an elongational flow of fluid. The rheometer apparatus 10 consists of an air cylinder 20 having an air piston 18 extending therefrom. A lower cylinder 16 is positioned at the top of the air cylinder piston 18. Spaced from the lower cylinder 16 and vertically above is an upper cylinder 14. A structural arrangement 26 having an arm 24 is used to support the upper cylinder 14. A lock screw 22 is used to tighten the upper cylinder 14. A liquid sample 12 is positioned between upper and lower cylinders 14 and 16. A camera 27, of the high speed type A, is provided.

DISCUSSION OF OPERATION AND THEORY OF INVENTION

A small quantity ($\approx 30\ \mu l$) of liquid 12 is inserted between the ends of two cylinders 14 and 16 that are vertically oriented one above the other. The upper cylinder 14 is held fixed while the lower cylinder 16 rests initially on top of an air cylinder piston 18. When activated, the piston 18 quickly retracts downwardly allowing the cylinder 16 to fall and stretch the liquid sample 12 adhering between the end surfaces of the two cylinders 14 and 16. The high speed camera 27 is used to photograph the falling cylinder 16 and the ligament stretching.

Figure 2:
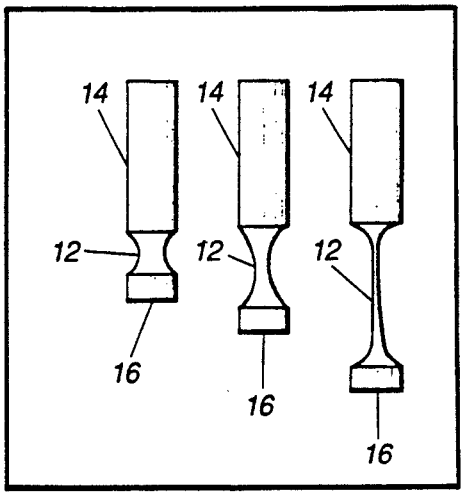
FIG. 2 is an example of a few selected frames of a 34 poise Newtonian oil sample.

Referring now to FIG. 2 of the drawings, this shows the falling cylinder stretching the attached ligament at three times. The time sequence photographs are then used to determine the ligament stretching force $T_{11}$ and elongation rate $\epsilon$. Onc $T_{11}$ and $\epsilon$ are measured, the elongational viscosity $\eta_e$, defined as $$\eta_e = T_{11}/\epsilon$$

is easily obtained. From analysis of the cylinder 16 drop and ligament kinetics it is possible to determine $T_{11}$ and $\epsilon$ using the following expressions, respectively $$T_{11} = (m(g-a) - \alpha\pi r)/\pi r^2$$

and $$\epsilon = -2V_r/r$$

where m and a are the mass and acceleration of the falling cylinder 16, g is the gravitational constant, $V_r$ and r are the radial velocity and radius of the ligament, and $\alpha$ is the liquid surface tension.

In FIG. 2, there is illustrated an example of a few selected frames taken of a 34 poise Newtonian oil sample 12. A 0.81 mg cylinder was used to stretch the sample 12 which resulted in an elongation rate that ranged from 50 to 60 $sec^{-1}$ which is near the order of magnitude believed associated with viscoelastic breakup. The calculated extensional viscosity was within 10 percent of the predicted Trouton value, i.e. for a Newtonian liquid the elongational viscosity is three times the shear viscosity.

Extensional measurements were also made using other Newtonian liquids ranging in viscosity from 4 to 35 poise. Similar or better agreement between the measured and expected viscosity were obtained, verifying the elongational nature of the flow and the capability of the experimental technique to measure this liquid characteristic.

Figure 3:
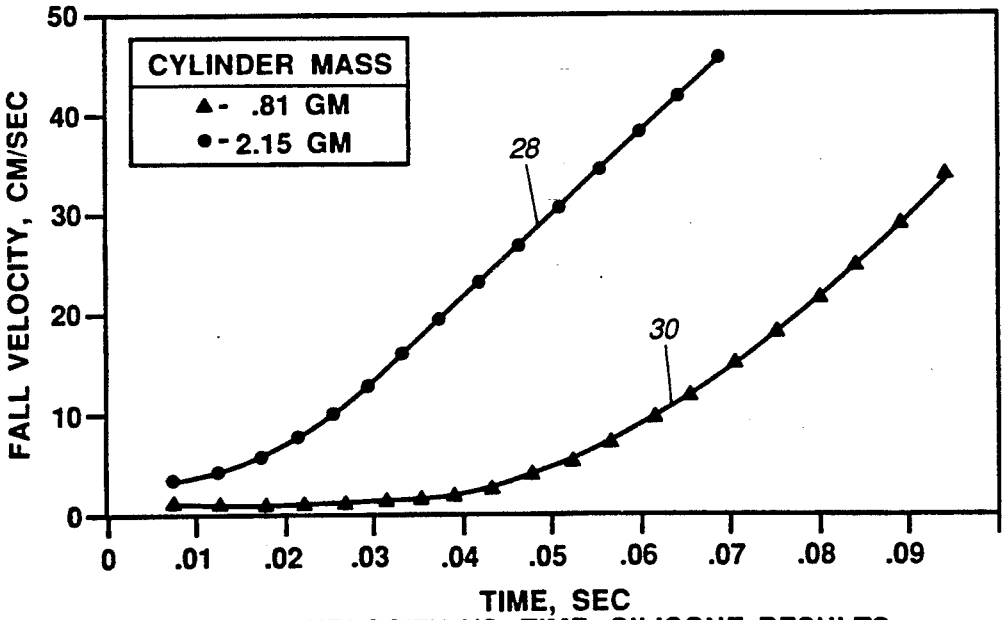
FIG. 3 is a curve of fall velocity versus time for silicone.

Referring now to FIG. 3, there is shown how one can increase the fall velocity and thus the deformation rate by increasing the cylinder mass. In this example a 30 poise liquid silicone sample was first stretched using a 0.81 and then with a 2.15 gm cylinder.

The larger cylinder resulted in a deformation rate of about 80 $sec^{-1}$ which is about 15 percent greater than that obtained with the lighter cylinder. Higher extension rates using heavier cylinders are conceivable provided a measurable difference between the fall and gravitational acceleration of the cylinder is obtained. Lower extension rates are possible using lighter cylinder masses.

Accordingly, modifications and variations to which the invention is susceptible may be practiced without departing from the scope and intent of the appended claims.

What is claimed is:

1. A falling extensional rheometer for measuring the elongational viscosity of a polymeric medium, comprising, an upper fixed means having a free end, a lower movable means having a free end, said upper fixed means and said lower movable means being vertically oriented and having their longitudinal axes substantially coincidental and their ends parallel spaced from each other, means for supporting said lower movable means and then retracted downwardly allows said lower movable means to fall and stretch a medium adhering between the ends of said upper fixed means and said lower movable means.

2. A falling extensional rheometer for measuring the elongational viscosity of a polymeric medium as recited in claim 1, wherein the means for supporting the lower movable means is an air cylinder with a piston.

3. A falling extensional rheometer for measuring the elongational viscosity of a polymeric medium as recited in claim 1, wherein the upper fixed means is a first cylinder.

4. A falling extensional rheometer for measuring the elongational viscosity of a polymeric medium as recited in claim 1, wherein the lower movable means is a second cylinder.

5. A falling extensional rheometer for measuring the elongational viscosity of a polymeric medium as recited in claim 1, and additionally high speed camera means for photographing said lower movable means and a ligament of the medium stretching.

6. A falling cylinder extensional rheometer for measuring the elongational viscosity of a polymeric medium, comprising, an upper fixed cylinder means having a free end, a lower movable cylinder means having a free end, said upper fixed cylinder means and said lower movable cylinder means being vertically oriented and having their longitudinal axes substantially coincidental and their ends parallel spaced from each other, piston means for supporting said lower movable cylinder means and when retracted downwardly allows said lower movable cylinder means to fall and stretch a medium adhering between the ends of said upper fixed cylinder means and said lower movable cylinder means.

7. A falling cylinder extensional rheometer for measuring the elongational viscosity of a polymeric medium as recited in claim 6, and means for recording said lower cylinder upon falling and a ligament of the medium stretching.

* * * * *